(12) United States Patent
    Caristan

(10) Patent No.: US 10,141,814 B2
(45) Date of Patent: Nov. 27, 2018

(54) LIQUID CRYOGEN VAPORIZER METHOD AND SYSTEM

(71) Applicant: AIR LIQUIDE INDUSTRIAL U.S. LLP, Houston, TX (US)

(72) Inventor: Charles L. Caristan, Houston, TX (US)

(73) Assignee: Airgas USA, LLC, Radnor, PA (US)

( * ) Notice: Subject to any disclaimer, the term of this patent is extended or adjusted under 35 U.S.C. 154(b) by 26 days.

(21) Appl. No.: 15/282,435

(22) Filed: Sep. 30, 2016

(65) Prior Publication Data

US 2017/0098977 A1    Apr. 6, 2017

Related U.S. Application Data

(60) Provisional application No. 62/236,532, filed on Oct. 2, 2015, provisional application No. 62/235,868, filed on Oct. 1, 2015.

(51) Int. Cl.
    *F17C 9/04*    (2006.01)
    *H02K 7/18*    (2006.01)
    (Continued)

(52) U.S. Cl.
    CPC ........... *H02K 7/1823* (2013.01); *F01D 15/10* (2013.01); *F02C 1/002* (2013.01); *F17C 7/02* (2013.01); *F17C 7/04* (2013.01); *F17C 9/04* (2013.01); *F05D 2210/12* (2013.01); *F05D 2220/32* (2013.01); *F17C 2221/011* (2013.01); *F17C 2221/012* (2013.01); *F17C 2221/013* (2013.01); *F17C 2221/014* (2013.01); *F17C 2221/032* (2013.01); *F17C 2223/0161* (2013.01); *F17C 2223/033* (2013.01); *F17C 2223/035* (2013.01);
    (Continued)

(58) Field of Classification Search
    CPC ...... F17C 7/02; F17C 7/04; F17C 9/02; F17C 9/04
    See application file for complete search history.

(56) References Cited

U.S. PATENT DOCUMENTS 4,786,673 A * 11/1988 Morival ................. C08K 5/053
                                                  524/101
8,069,678 B1 * 12/2011 Bernert ................. F28F 9/0282
                                                   62/50.2
(Continued)

FOREIGN PATENT DOCUMENTS

EP    0 580 910    2/1994

OTHER PUBLICATIONS

International Search Report for and Written Opinion for corresponding PCT/US2016/054885, dated Jan. 19, 2017.
(Continued)

*Primary Examiner* — Brian King
(74) *Attorney, Agent, or Firm* — Elwood L. Haynes; Christopher J. Cronin

(57) ABSTRACT

Liquid cryogen from a tank having a head space pressure P1 is vaporized with a pressure building vaporizer to gaseous cryogen and the pressure of the gaseous cryogen is built to a pressure P2. The pressurized gaseous cryogen at pressure P2 is expanded across an expander to decrease its pressure and fed to a point of use at an installation including the vaporizer at a pressure P3. P2≥2×P3. Energy from the expanded gas may be recovered in the form of mechanical energy, electrical energy.

17 Claims, 11 Drawing Sheets

(51) Int. Cl.
*F17C 7/04* (2006.01)
*F01D 15/10* (2006.01)
*F02C 1/00* (2006.01)
*F17C 7/02* (2006.01)

(52) U.S. Cl.
CPC .. *F17C 2225/0123* (2013.01); *F17C 2225/03* (2013.01); *F17C 2225/035* (2013.01); *F17C 2225/036* (2013.01); *F17C 2227/0311* (2013.01); *F17C 2227/0316* (2013.01); *F17C 2227/0393* (2013.01); *F17C 2265/05* (2013.01); *F17C 2265/07* (2013.01); *F17C 2270/0168* (2013.01); *F17C 2270/0581* (2013.01); *Y02E 60/321* (2013.01)

(56) References Cited

U.S. PATENT DOCUMENTS

| | | | | |
|---|---|---|---|---|
| 2003/0126867 A1* | 7/2003 | Drube | ................ | F17C 7/04 62/50.2 |
| 2003/0159800 A1* | 8/2003 | Nierenberg | ................ | F17C 5/06 165/41 |
| 2004/0107700 A1* | 6/2004 | McClanahan | ........... | F01K 25/08 60/670 |
| 2005/0193743 A1* | 9/2005 | Foss | ................ | C21D 1/613 62/50.2 |
| 2010/0083670 A1* | 4/2010 | Dutt | ................ | F17C 9/02 62/50.2 |
| 2011/0023501 A1* | 2/2011 | Schulte | ................ | F17C 5/06 62/50.2 |
| 2012/0144846 A1* | 6/2012 | Johanson | ................ | F17C 5/02 62/50.5 |
| 2014/0116062 A1* | 5/2014 | Hartono | ................ | F17C 9/00 60/772 |

OTHER PUBLICATIONS

Trifecta X-Series, Laser Assist Gas Supply System for Inert Service (600 MAWP); 2 pgs; 2103 Chart Inc.; www.chartindustries.com.
Trifecta High-Pressure Gas Supply System; 2 pgs; Air Liquide America Corporation.

* cited by examiner

LIQUID CRYOGEN VAPORIZER METHOD AND SYSTEM

CROSS-REFERENCE TO RELATED APPLICATIONS

This application claims the benefit of priority under 35 U.S.C. § 119 (e) to U.S. Provisional Patent Application No. 62/235,868, filed Oct. 1, 2015, and to U.S. Provisional Patent Application No. 62/236,532, filed Oct. 2, 2015, the entire contents of which are incorporated herein by reference.

BACKGROUND

Field of the Invention

The present invention relates to the supply of industrial gas from vaporizers fed with liquefied gas.

Related Art

Many manufacturing operations utilize industrial gases for applications, such as welding, cutting, heating, cooling, curing, inerting, burning, etc. For operations consuming large amounts of industrial gas, it is more economical to store the gas in liquefied form. For these types of operations, the gas is obtained by feeding liquefied gas from a storage tank to an ambient temperature vaporizer where the heat of the ambient atmosphere provides the required latent heat of vaporization. Typically the storage tank has a head space pressure superior to any pressure of any component between the storage tank and the point of use for applications such as cited above. In some cases where the gas pressure required at the point of use is larger than the headspace pressure of the storage tank, then a pressure booster system is installed between the storage tank and the point of use. Typically, the relatively high pressure gas resulting from vaporization is reduced to the pressure required by the point of use consuming that gas. Conventional vaporizers and associated gas distribution equipment used in the industrial gas industry (for gases such as oxygen, nitrogen, argon, carbon dioxide, hydrogen, hydrocarbon fuels), however, do not recover any substantial portion of the useful energy from this pressure reduction process.

Liquid nitrogen-powered vehicles are known that vaporize liquid nitrogen and expand the resultant gaseous nitrogen across a turbine. The nitrogen expanded to ambient pressure and simply vented to the atmosphere. While technically interesting, it exhibits poor energy efficiency in that high amounts of electricity is consumed during compression of air fed to air separation units responsible for producing the liquid nitrogen to be used by the vehicle. Also, the nitrogen exhausted from the vehicle is not utilized in any particular useful way.

Thus, it is an object to recovery any useful energy associated with the pressure reduction of a relatively higher pressure gas, resulting from vaporization at a vaporizer.

SUMMARY

There is disclosed a method for vaporizing liquid cryogen to supply a flow of gaseous cryogen. The method includes the following steps. A liquid cryogen from a tank having a head space pressure P1 is fed to at least one pressure building vaporizer located at an installation. Heat is exchanged between ambient air (and/or another fluid) and the fed liquid cryogen across said at least one vaporizer to produce pressurized gaseous cryogen at a pressure P2. The pressurized gaseous cryogen is expanded to a pressure lower than P3 and fed to a point of use at a pressure P3, wherein P2≥2×P3. Optionally, the expanded gaseous cryogen is fed to a turbine so as to produce mechanical energy. The mechanical energy is optionally converted to electrical energy with an alternator.

There is also disclosed a system for vaporizing liquid cryogen to supply a flow of gaseous cryogen, comprising: a liquid cryogen storage tank containing liquid cryogen, the tank being located at an installation; at least one pressure-building vaporizer receiving the liquid cryogen form the tank and vaporizing the received liquid cryogen; an expander located at the installation expanding the vaporized cryogen received from the at least one pressure-building vaporizer and producing mechanical power to actuate a mechanical device such as for example a rotating turbine or a displacement piston; a generator located at the installation converting the mechanical power to electrical power; and a point of use receiving the expanded cryogen from the turbine, the point of use being located at the installation; and a point of use or of storage of the corresponding electrical energy.

The method and/or system may include one or more of the following aspects:

said at least one pressure building vaporizer comprises n pressure building vaporizers operated in an alternating sequence where n is an integer equal or greater than 1; as the liquid cryogen is being fed to a first of the n vaporizers, no liquid cryogen is being fed to a second of the n vaporizers; simultaneous with feeding the liquid cryogen to the first vaporizer, gaseous cryogen is fed from another of the n vaporizer to the turbine and expanded with said turbine; and simultaneous with feeding the liquid cryogen to the second vaporizer, gaseous cryogen is fed from another of the n vaporizers to the turbine and expanded across the turbine.

the liquid cryogen source has a headspace pressure $P_{head}$ and the at least one pressure building vaporizer comprises n pressure building vaporizers operated in an alternating sequence where n is an integer equal or greater than 1, the alternating sequence including the following sequential steps:

initiating the feeding of a predetermined amount of the liquid cryogen to a first of the n vaporizers when a pressure of the cryogen in the first vaporizer is less than or equal to a predetermined low pressure $P_L$;

after completion of said feeding of the liquid cryogen to the first vaporizer, allowing a pressure of the cryogen in the first vaporizer to build through said heat exchange to a predetermined high pressure $P_H$;

when the pressure of the cryogen in the first vaporizer reaches $P_H$, expanding the gaseous cryogen from the first vaporizer in series across a first venturi and the turbine, the first venturi including a throat and a suction inlet downstream of the throat, said expansion of the gaseous cryogen from the first vaporizer being carried out until a pressure of the cryogen in the first vaporizer is decreased to a predetermined pressure $P_I$ at which time said expansion of the cryogen from the first vaporizer is ceased;

contemporaneous with said expansion of the gaseous cryogen from the first vaporizer across the first venturi and the turbine, allowing a flow of the gaseous cryogen from a second of the n vaporizers into the first venturi suction inlet until a pressure of the cryogen in the second vaporizer is decreased from a predetermined intermediate/low pressure $P_{IL}$ to $P_L$, the flow of gaseous cryogen from the second vaporizer to the suction inlet of the first venturi being prevented once the pressure of the cryogen in the second vaporizer is decreased to $P_L$;

when the pressure of the cryogen in the second vaporizer is decreased to $P_L$, initiating the feeding of a predetermined amount of the liquid cryogen to the second vaporizer;

simultaneous with said feeding of the liquid cryogen to the second vaporizer, said expansion of the gaseous cryogen from the first vaporizer in series across a first venturi and the turbine is continued until a pressure of the gaseous cryogen in the first vaporizer is decreased to $P_{IL}$ and a pressure of the cryogen in the second vaporizer is allowed to build through said heat exchange to $P_H$; and when the building pressure of the cryogen in the second vaporizer reaches $P_H$ and the pressure of the cryogen in the first vaporizer reaches $P_{IL}$, said expansion of the gaseous cryogen from the first vaporizer across the first venturi and the turbine is ceased, expansion of the gaseous cryogen from the second vaporizer in series across a second venturi and the turbine is initiated, and a flow of the gaseous cryogen is allowed from the first vaporizer and into a suction inlet of the second venturi until a pressure of the cryogen in the first vaporizer is decreased from $P_{IL}$ to $P_L$, the flow of gaseous cryogen from the first vaporizer to the suction inlet of the second venturi being prevented once the pressure of the gaseous cryogen in the first vaporizer is decreased to $P_L$.

the cryogen is selected from the group consisting of cryogen, nitrogen, oxygen, argon, helium, hydrogen, and carbon dioxide.

the electricity is stored in a battery.

the electricity is consumed at the installation.

the electricity is input to an electrical grid.

the point of use includes a laser supplied with nitrogen.

the point of use includes an autoclave for curing polymers and composites the system further comprising n first valves, n second valves and a controller, wherein: the at least one pressure building vaporizer comprises n pressure building vaporizers adapted and configured to be operated in an alternating sequence where n is an integer greater than 1; the n first valves are respectively associated with the n vaporizers and are operable to independently allow or prevent receipt of liquid cryogen from the storage tank to one or more of the n vaporizers; the n second valves are respectively associated with the n vaporizers and are operable to independently allow or prevent receipt of vaporized cryogen from one or more of the n vaporizers to the turbine; and the controller is a programmable logic controller programmed with logic adapted to maintain the first valve associated with the first vaporizer in an open position to allow the first vaporizer to be filled with liquid cryogen while contemporaneously maintaining the second valve associated with the second vaporizer in an open position to allow expansion of gaseous cryogen from the second vaporizer across the turbine, contemporaneously maintaining the first valve associated with the second vaporizer in a closed position to prevent the second vaporizer from being filled with the liquid cryogen from the storage tank, and contemporaneously maintaining the second valve associated with the first vaporizer in a closed position to prevent the expansion of gaseous cryogen from the first vaporizer across the turbine.

the system further comprises a battery storing electricity generated by the generator.

the generator is connected to an electrical grid and inputs the generated electricity to the electrical grid.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
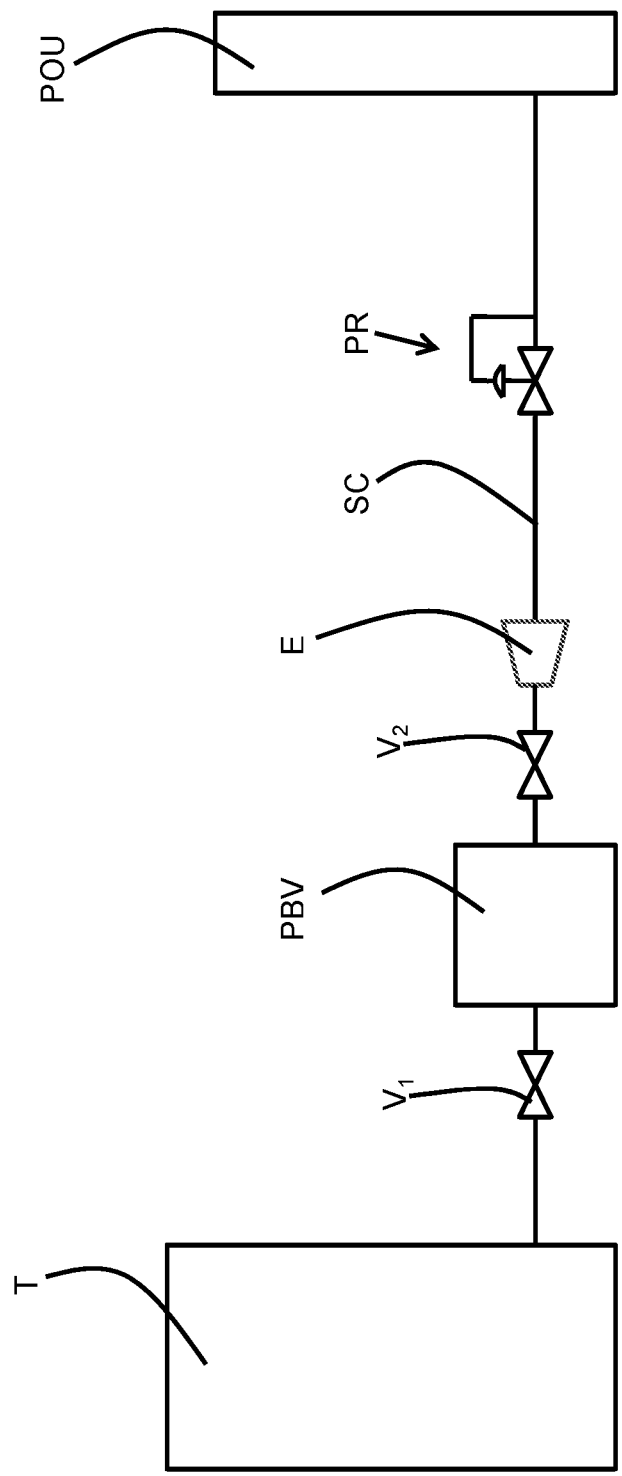
FIG. 1 is a schematic view of a first embodiment of the invention.

Instead of using a conventional vaporizer for providing a pressure-regulated flow of gaseous cryogen at an installation for meeting an end user's pressure specification at an installation, a pressure builder is used to build pressure of vaporized liquid cryogen to a level that is at least double the pressure of the end user's pressure specification at an installation, and subsequently, the pressurized now-gaseous cryogen is pressure-regulated down to the specification. In doing so, energy may be recovered (in the form of vacuum, mechanical or electrical energy) from the pressurized gaseous cryogen before it is distributed to the end user at the installation. Mechanical or electrical energy may be recovered by expansion of pressurized gaseous cryogen from the vaporizer across a turbine or other suitable device. In other words, the force of the expanding gas causes rotation of the turbine/device. The rotational (mechanical) energy of the turbine/device can then either be directly used to drive a shaft or it may be converted to electrical energy with an alternator. When multiple pressure builders are used, pressure reduction of pressurized gaseous cryogen from one of the pressure builders, via a laval nozzle, may be used to enhance filling of another of the pressure builders, thereby recovering energy from a vacuum generated at nozzle.

The vaporizer of the invention receives liquid cryogen from a liquid cryogen source such as a storage tank. Typical cryogens include but are not limited to nitrogen, oxygen, argon, carbon dioxide, hydrogen, and hydrocarbons. While the type of storage tank is not limited and a relatively higher pressure storage tank can operate with headspace pressure of 600 psi or more, typically, the liquid cryogen is stored with a headspace pressure of about 30 to about 200 psi.

Pressure-building vaporizers are well-known in the art of industrial gas storage. They exchange heat between, on one hand, either ambient air or a heat exchange fluid such as cooling water, and on the other hand, the liquid cryogen and/or vaporized liquefied cryogen. The latent heat necessary for vaporization of the liquid cryogen is obtained from the ambient air or the heat exchange fluid. As the liquid cryogen vaporizes, it undergoes a volume change of about a couple orders of magnitude. For example, an amount of gaseous nitrogen occupies about 700 times the volume than does an equivalent amount of liquid nitrogen. As the already-vaporized cryogen is heated through heat exchange with the ambient air or heat exchanger at the pressure-building vaporizer, the pressure will increase. Put another way, the Ideal Gas Law tells us that, for a fixed volume and amount of gas, the pressure P is proportional to the temperature of the gas expressed in Kelvin.

Any type of pressure-building vaporizer can be utilized in practice of the invention so long as it is provided with a valve allowing it to be fed with liquid cryogen from the liquid cryogen source and to isolate it from the liquid cryogen source. The pressure-building vaporizer is also provided with a valve isolating it from the downstream turbine thereby allowing it to build pressure through heat exchange with the ambient atmosphere (or heat exchange fluid).

The gaseous cryogen is pressure reduced at an expander to the pressure specified by the end use at the installation. Typically, the gaseous cryogen is pressure reduced to a pressure equal to or greater than about 500 or 600 psi. Typical flow rates from the vaporizer(s) and turbine range from about 1,000-100,000 std ft$^3$/hr. It is important to note that the end user's required flow rate and pressure drive the flow rate and pressure of the gaseous cryogen downstream of the expander, and if selected, the turbine or other energy generation device. Towards this end, if the pressure of the gaseous cryogen from the turbine/device exceeds the end user's specification, conventional pressure regulation equipment can be used to reduce the pressure to the end user's specification. The skilled artisan will recognize that, with such goals in mind, the vaporizer(s) and turbine of the invention can be used to replace any conventional vaporizer(s) located at the installation. The chief advantage is of course the recovery of energy from the pressure reduction of the gaseous cryogen that is otherwise lost by conventional vaporizers. While any turbine known in the art for handling flows of 1,000-100,000 std ft$^3$/hr may be used, typically the turbine is sealed well so as to avoid contamination of the gaseous cryogen with lubricant.

Rotation energy of the turbine/device can either be stored or consumed at the installation. The rotation energy can be converted to electricity with an alternator and the resultant electrical energy stored in a battery. Alternatively, the rotation energy can be stored in a flywheel. While any conventional flywheel may be suitable, greater efficiency will be realized by a flywheel under vacuum that uses magnetic bearings. The stored power can be drawn from the flywheel and converted to electricity for onsite (i.e., at the facility) consumption or for connection to the electrical grid if desired. Similarly, electricity produced by an alternator from conversion of the turbine's rotation energy can be consumed onsite (i.e., at the facility) or connected with the electrical grid if desired. The rotation energy may instead be used to drive a shaft powering another process at the installation.

Instead of a turbine/device for generating mechanical or electrical power, a laval nozzle may be selected for use as the expander, and vacuum energy may be recovered from the laval nozzle to enhance filling of a pressure builder. More particularly, when multiple pressure builders in parallel are used, while the gaseous cryogen from one pressure builder is expanded from the laval nozzle, that laval nozzle is in vacuum communication with an outlet of another pressure builder. By applying the vacuum to the outlet of the other pressure builder, it may be more quickly refilled with liquid cryogen. In this manner, the cycle time for filling a vaporizer, vaporizing the liquid cryogen to build pressure, and releasing that pressure may be decreased.

The expanded gaseous cryogen is consumed at a point of use located at the same installation that the vaporizer and expander are located at. The point of use is not limited and may include lasers requiring high pressure nitrogen and autoclaves for curing polymer or polymer-impregnated articles useful for production of composite articles.

Various embodiments for performing the invention will now be described.

As illustrated in FIG. 1, liquid cryogen is stored in a tank T having a headspace pressure P1 that is higher than ambient pressure. When valve $V_1$ is open, valve $V_2$ is closed, and the pressure within the pressure building vaporizer PBV is lower than a headspace pressure in the tank T, the pressure difference between the tank T and the vaporizer PBV causes the liquid cryogen to be fed to the vaporizer PBV. The vaporizer PBV is no longer fed with the liquid cryogen either upon reaching pressure equalization between the tank T and the vaporizer PBV or upon the closure of valve $V_1$.

With valves V1 and V2 remaining closed, the liquid cryogen is vaporized within vaporizer PBV through heat exchange with a relatively warmer fluid (such as air or cooling water). In this manner, the pressure of the now-gaseous cryogen is built to a higher pressure P2. Upon reaching P2, valve $V_2$ is opened and the gaseous cryogen exits the vaporizer PBV and is expanded across expander E where it is fed into supply conduit SC. The pressure of the gaseous cryogen is regulated to a predetermined pressure P3 specified by the point of use (where the gaseous cryogen is consumed or used) by a pressure regulator PR disposed in the supply conduit SC. Pressure P2 is at least double that of pressure P3 (i.e., P2≥2×P3).

Figure 2:
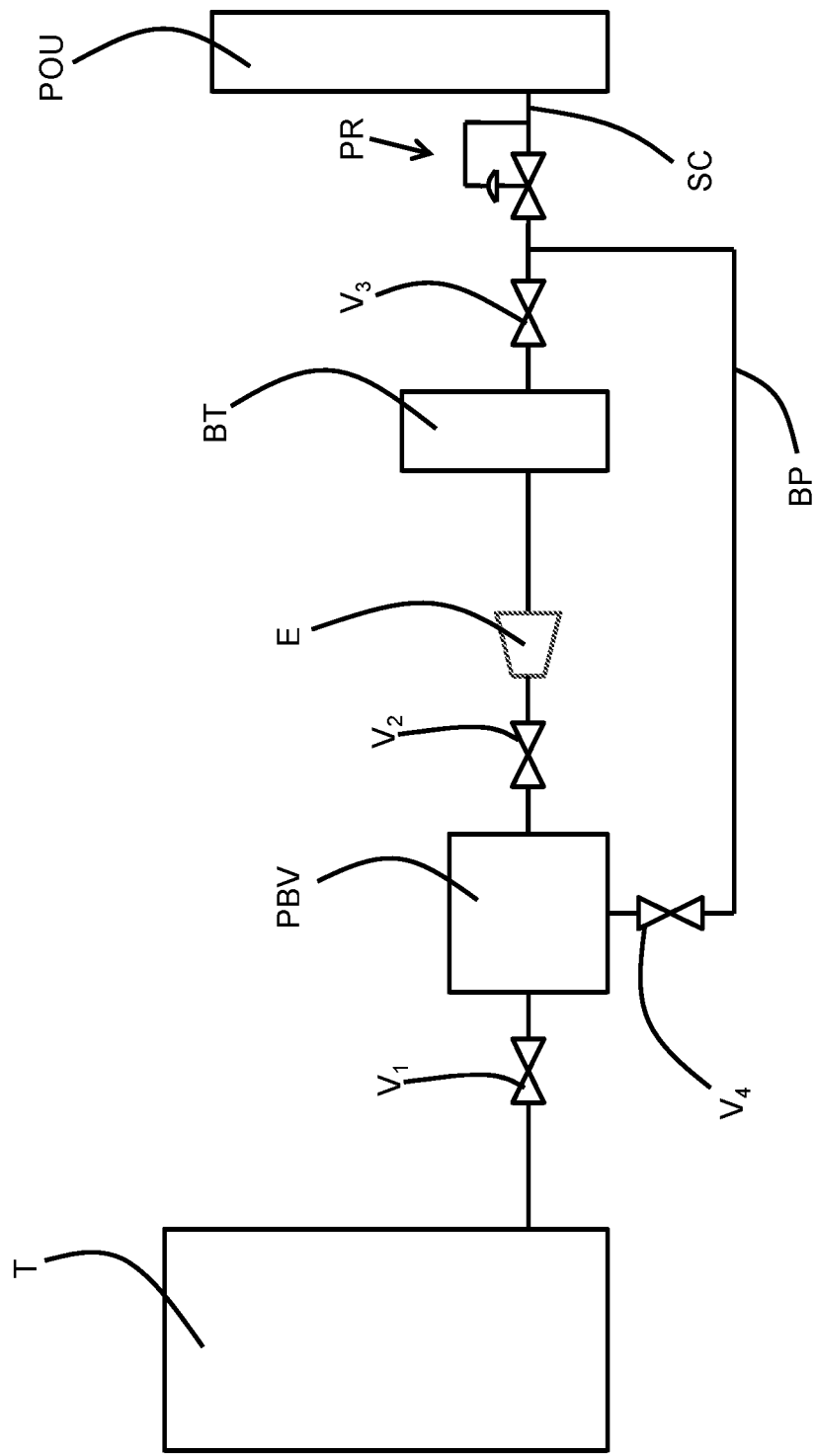
FIG. 2 is a schematic view of another embodiment of the invention with a buffer tank and bypass line.

The embodiment of FIG. 2 is the same as that of FIG. 1 except for the presence of buffer tank BT, valves $V_3$, $V_4$, and bypass line BP. While valves $V_1$, $V_3$, $V_4$ are closed and valve $V_2$ is opened, the gaseous cryogen (initially at pressure P2) is expanded across the expander E as in FIG. 1, but in this case, it is accumulated in a buffer tank BT. The buffer tank BT allows the point of use to fed with a varying flow rate. In other words, at some times the point of use may require a relatively lower flow rate of gaseous cryogen at which time it may be fed to the point of use POU via vaporizer V, valve $V_2$, expander E, buffer tank BT, valve $V_3$ and pressure regulator PR. Alternatively, the gaseous cryogen may be fed to the point of use POU via valve V4, bypass line BP, and pressure regulator PR. At other times, the point of use POU may require a relatively higher flow rate of gaseous cryogen at which time it may be fed with gaseous cryogen from buffer tank BT via valve $V_3$ and pressure regulator PR.

Typically, when the pressure of the gaseous cryogen in the vaporizer PBV is decreased below an intermediate pressure P4 (between P2 and P3), valve $V_2$ is closed and valve $V_4$ is opened. Instead of being fed with gas from the buffer tank BT, the gaseous cryogen is now fed from the vaporizer PBV into the supply conduit SC upstream of the pressure regulator PR via bypass line BP. One of ordinary skill in the art will recognize that, when the pressure of the gaseous cryogen in the vaporizer PBV reaches P2, valves V2, V4 may be closed and valve V3 opened to allow gaseous cryogen to exit the buffer tank BT into supply conduit SC where it is regulated to pressure P2 by the pressure regulator PR. At the same time, valve V1 is opened to allow the vaporizer PBV to be fed with fresh liquid cryogen from the tank T and begin a new cycle of filling/vaporization/expansion.

Figure 3:
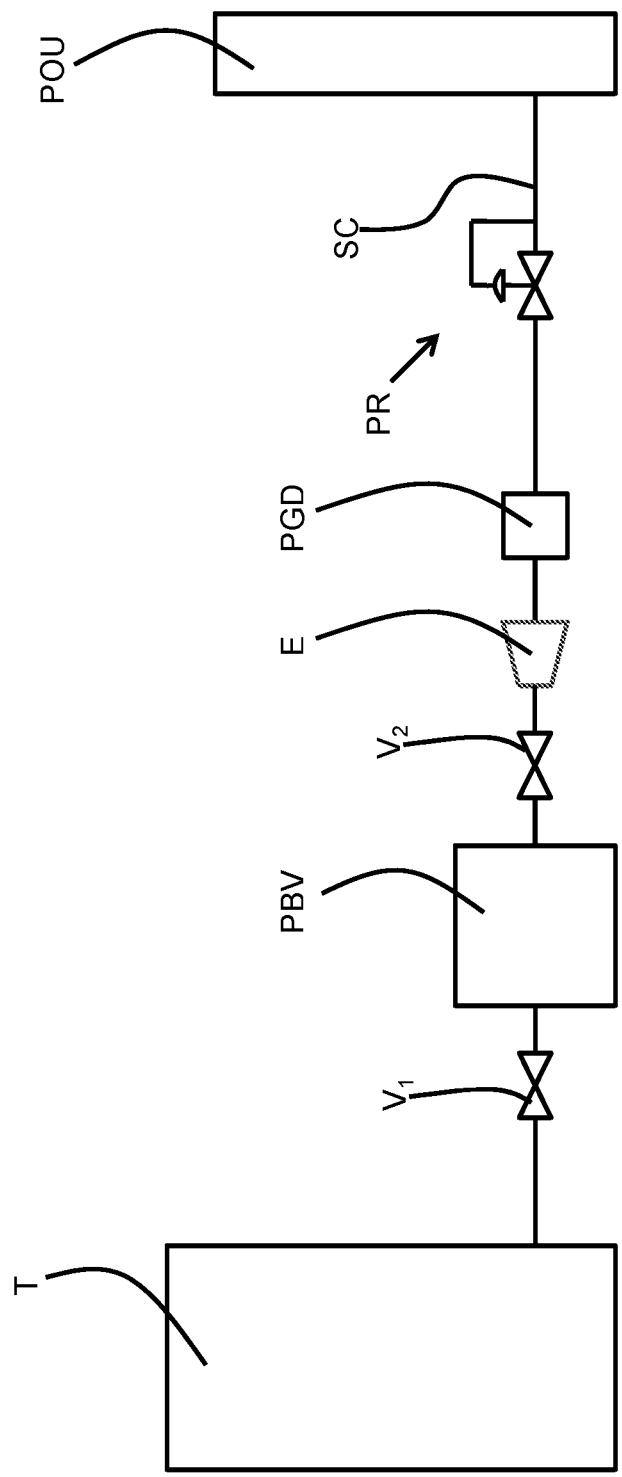
FIG. 3 is a schematic view of another embodiment of the invention with a power generation device.

The embodiment of FIG. 3 is the same as that of FIG. 1 except for the presence of a power generation device PGD. In this embodiment, the gaseous cryogen (initially at a pressure P2) exiting the expander is fed to a power generation device PGD which converts some of the kinetic energy of the relatively high momentum expanded gaseous cryogen into mechanical or electrical energy.

Any device known in the field of industrial gases for conversion of kinetic energy from a flow of gas into mechanical or electrical energy, such as an air motor, may be used as the power generation device PGD of the invention. Typically, the power generation device PGD is a turbine receiving a high momentum flow of gas from the expander E. The power generation device PGD may be fed with high momentum gas from one or more expanders E. As will be explained below, two or more (perhaps as many as 4-6) pressure building vaporizers PBV may be used to feed a single power generation device PGD, via a respective two or more (perhaps as many as 4-6) expanders E.

Figure 4:
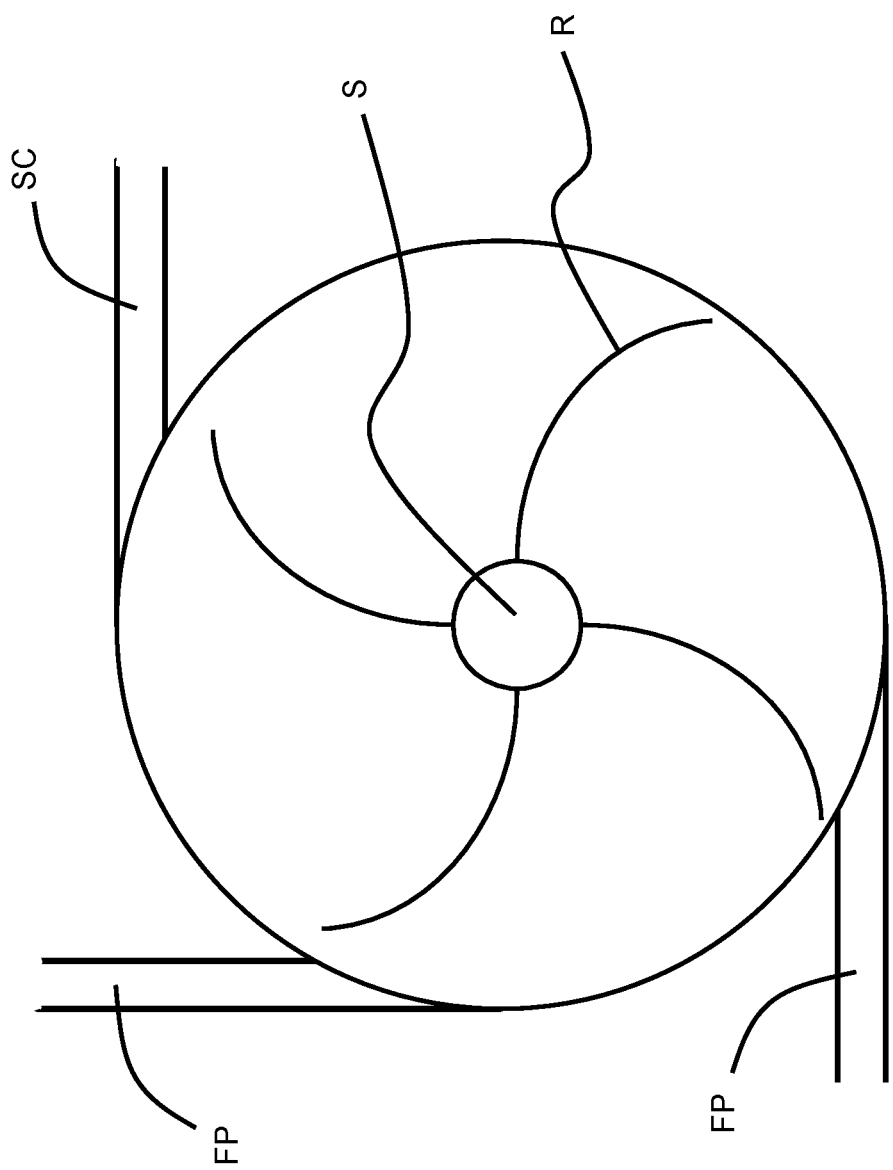
FIG. 4 is a schematic view of an embodiment of the power generation device.

As illustrated in FIG. 4, the power generation device PGD may be a gas turbine. Expanded gaseous cryogen from two expanders E is fed to the gas turbine via feed pipes FP. The rotors R of the gas turbine are connected to a shaft S. The high momentum gas flows against the rotors R causing the shaft S to rotate. The gas exiting the gas turbine enters into the supply conduit SC. The mechanical energy of the rotating shaft may be used to power another device at the installation. Alternatively, the rotational energy may be converted to electrical energy with a generator.

Figure 5:
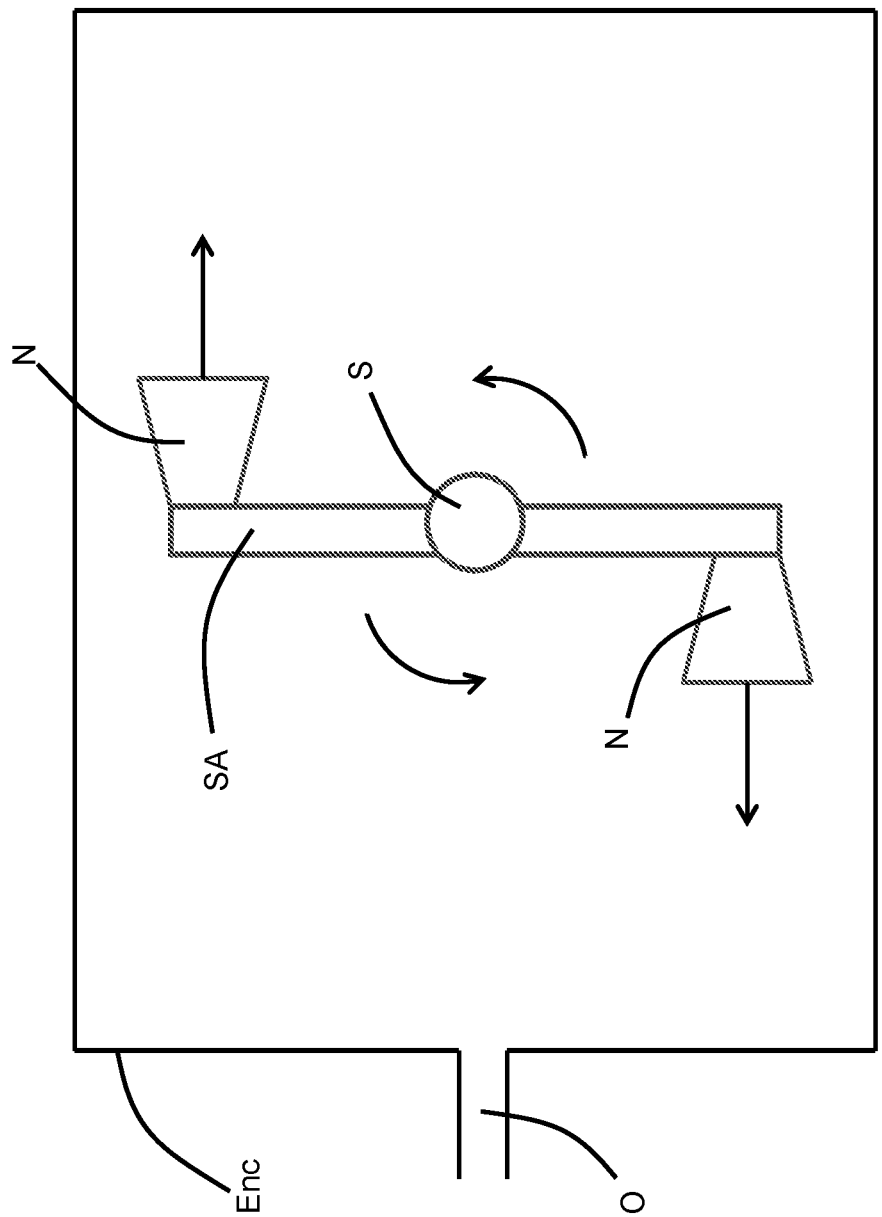
FIG. 5 is a schematic view of another embodiment of the power generation device.

As shown in FIG. 5, the power generation device PGD may include two rotating strut arms SA connected to a shaft S. The gaseous cryogen flows through an interior passage of each strut, into the expansion nozzle and out the expansion nozzle into an interior space of the buffer tank. Since the gaseous cryogen is expanded from the expansion nozzles in different directions, this causes the nozzles, struts, hub and drive shaft (which are fixed to one another) to rotate. The drive shaft is operably associated with a generator which converts the rotational energy into electrical energy.

The rotating shaft SA includes two conduits (not illustrated) each receiving the high momentum gas from the expander E and feeding it to a respective two expansion nozzles N. Since the gaseous cryogen is expanded from the expansion nozzles N in different directions, this causes rotation of the strut arms SA. As with the embodiment of FIG. 4, the mechanical energy of the rotating shaft may be used to power another device at the installation. Alternatively, the rotational energy may be converted to electrical energy with a generator. The gas leaves the enclosure Enc via an outlet O and is fed into the supply conduit SC. The shaft S may be provided with appropriate gearing in order to achieve the desired rotational speed.

Figure 6:
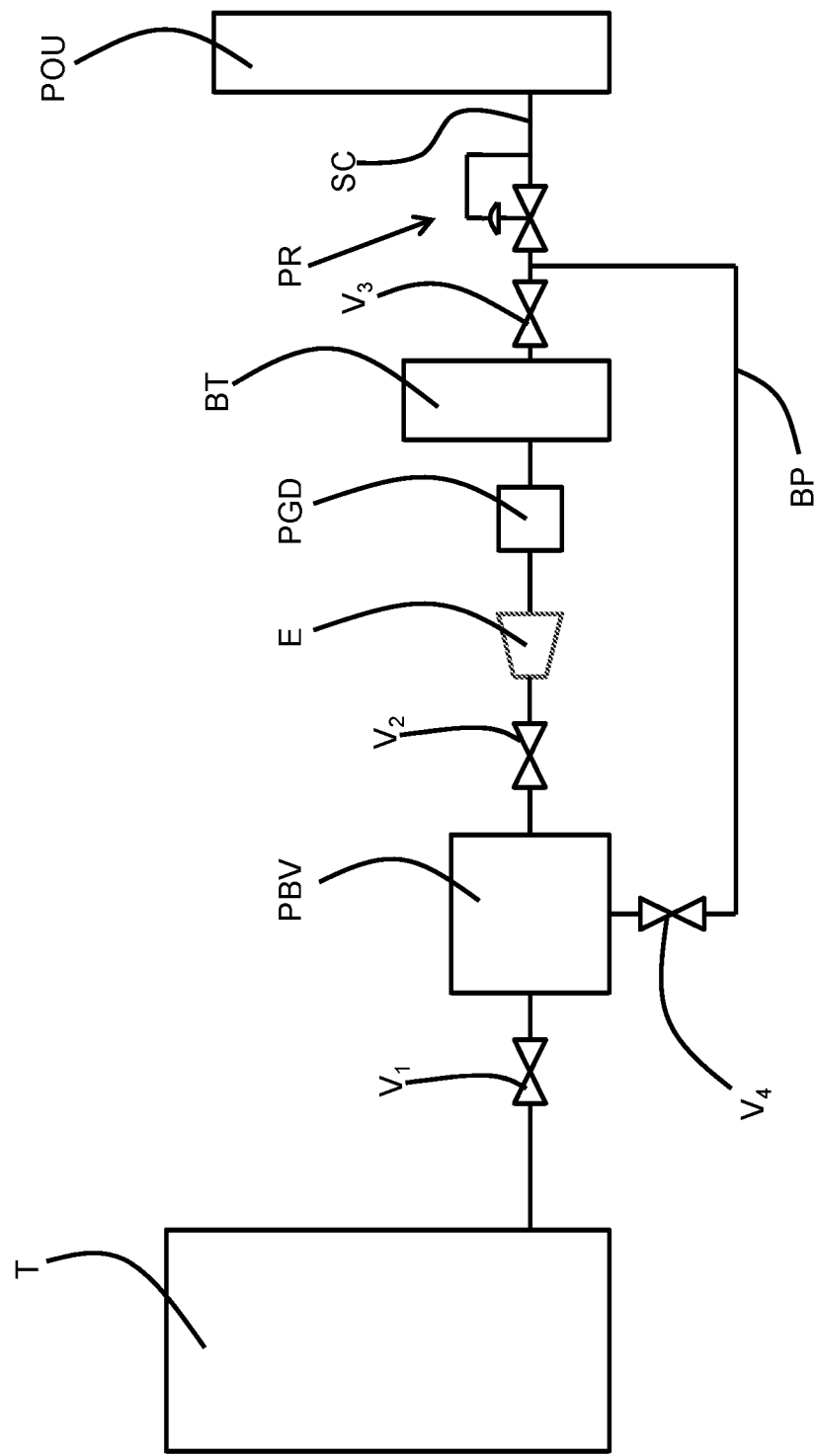
FIG. 6 is a schematic view of another embodiment of the invention with a buffer tank, bypass line, and a power generation device.

The embodiment of FIG. 6 is the same as that of FIG. 1 except for the presence of buffer tank BT, valves $V_3$, $V_4$, bypass line BP, and power generation device PGD. Each of these additional features is operated and behaves in the same manner as in the embodiments of FIGS. 2 and 3.

Figure 7:
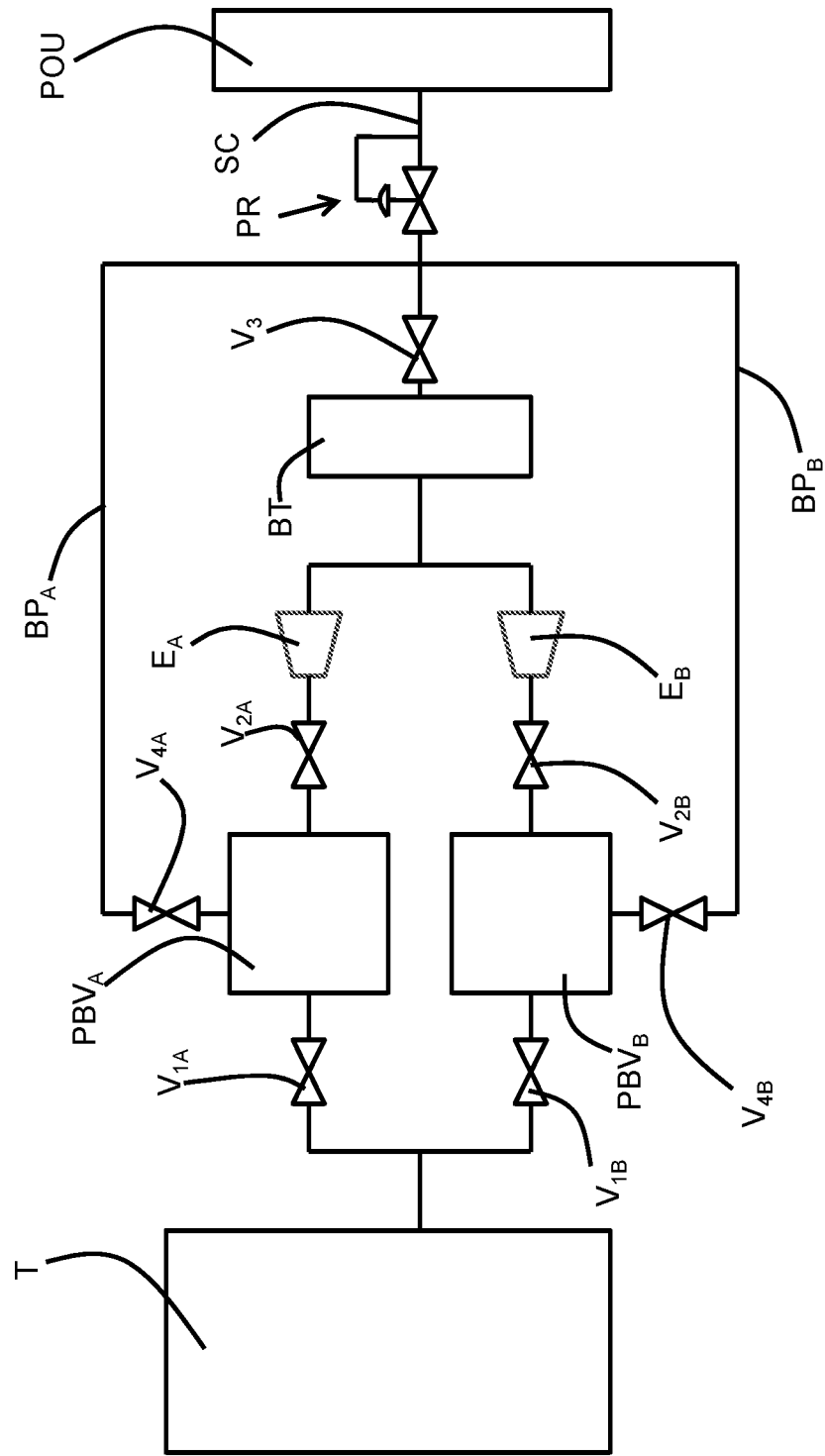
FIG. 7 is a schematic view of another embodiment of the invention with two pressure building vaporizers in parallel, a buffer tank, ad a bypass line.

In the embodiment of FIG. 7, liquid cryogen is stored in a tank T having a headspace pressure P1 that is higher than ambient pressure. This embodiment experiences a different cycle in comparison to the embodiments of FIGS. 1-3 and 6.

In a first phase, valve $V_{1A}$ is open and valve $V_{2A}$ is closed and the pressure of the headspace in the tank T is higher than that of the first pressure building vaporizer $PBV_A$. This pressure differential causes liquid cryogen to be fed to the first vaporizer $PBV_A$ via valve $V_{1A}$. At the same time, valve $V_{1B}$ is closed and valve $V_{2B}$ is open and already-vaporized cryogen exits a second pressure building vaporizer $PBV_B$, is expanded across expander $E_B$ and is received by the buffer tank BT. The pressure regulator PR regulates a pressure of the gaseous cryogen from the buffer tank BT to the point of use POU to the point of use-required pressure P3.

In a second phase, valve $V_{1A}$ is closed and the flow of liquid cryogen from the tank T to the first vaporizer $PBV_A$ ceases. The liquid cryogen in the first vaporizer $PBV_A$ is vaporized through heat exchange with a relatively warmer fluid (such as ambient air or cooling water). In this manner, the pressure of the gaseous cryogen in the first vaporizer $PBV_A$ is built up to a higher pressure P2. Pressure P2 is at least double that of pressure P3 (i.e., P2≥2×P3). At some point in between the closing of valve $V_{1A}$ and the pressure of the gaseous cryogen being built up to pressure P2 in the first vaporizer $PBV_A$, the pressure of the gaseous cryogen in the second vaporizer $PBV_B$ decreases to an intermediate pressure P4 in between P2 and P3. When it decreases to a pressure below P4, valve $V_{2B}$ is closed and valve $V_{4B}$ is open and the gaseous cryogen exits the second vaporizer $PBV_B$ and is fed to the point of use POU via valve $V_{4B}$, a second bypass line $BP_B$, the pressure regulator PR, and the supply conduit SC.

In a third phase, the pressure in the second vaporizer $PBV_B$ reaches pressure P3 and the pressure in the first vaporizer $PBV_A$ reaches pressure P2. At this time, valves $V_{2B}$, $V_{4B}$ are closed and valve $V_{2A}$ is opened. Due to the pressure difference between the headspace pressure P1 of tank T and the pressure P2 in the second vaporizer $PBV_B$, liquid cryogen is caused to be fed to the second vaporizer $PBV_B$ from the tank T via valve $V_{1B}$. At the same time, already-vaporized cryogen (initially at pressure P2) exits the first vaporizer $PBV_A$, is expanded across expander $E_A$ and is received by the buffer tank BT. The pressure regulator PR regulates a pressure of the gaseous cryogen from the buffer tank BT to the point of use POU to the point of use-required pressure P3.

In a fourth phase, valve $V_{1B}$ is closed and the flow of liquid cryogen from the tank T to the second vaporizer $PBV_B$ ceases. The liquid cryogen in the second vaporizer $PBV_B$ is vaporized through heat exchange with a relatively warmer fluid (such as ambient air or cooling water). In this manner, the pressure of the gaseous cryogen in the second vaporizer $PBV_B$ is built up to pressure P2. As mentioned above, pressure P2 is at least double that of pressure P3 (i.e., P2≥2×P3). At some point in between the closing of valve $V_{1B}$ and the pressure of the gaseous cryogen being built up to pressure P2 in the second vaporizer $PBV_B$, the pressure of the gaseous cryogen in the first vaporizer $PBV_A$ decreases to an intermediate pressure P4 in between P2 and P3. When it decreases to a pressure below P4, valve $V_{2A}$ is closed and valve $V_{4A}$ is open and the gaseous cryogen exits the first vaporizer $PBV_A$ and is fed to the point of use POU via valve $V_{4A}$, a second bypass line $BP_A$, the pressure regulator PR, and the supply conduit SC.

When the pressure in the first vaporizer $PBV_A$ reaches pressure P3 and the pressure in the second vaporizer $PBV_B$ reaches pressure P2, the cycle is repeated and rolls over to the first phase.

Figure 8:
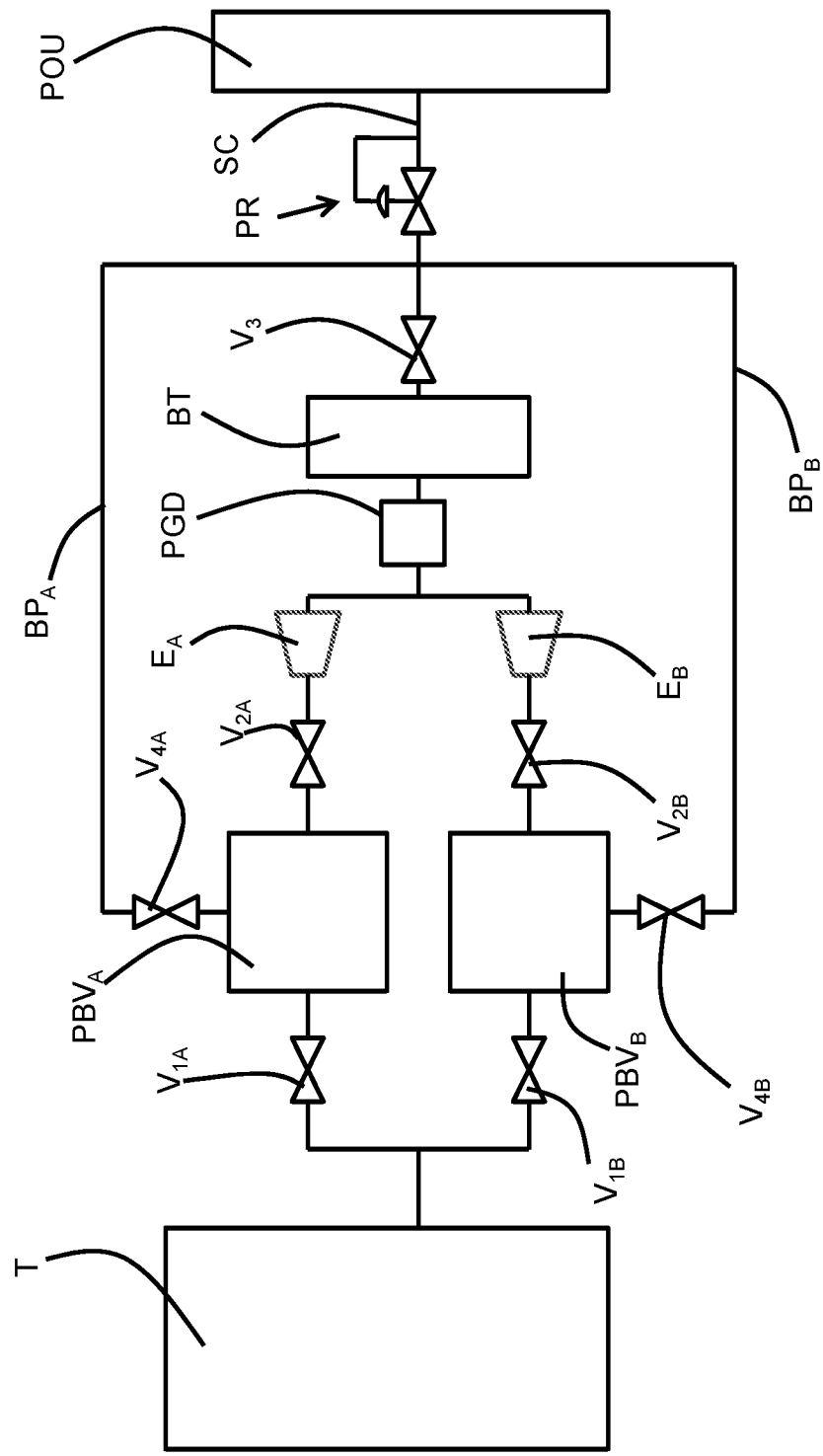
FIG. 8 is a schematic view of another embodiment of the invention with two pressure builders in parallel, a buffer tank, ad a bypass line.

The embodiment of FIG. 8 is the same as that of FIG. 7 except for the presence of power generation device PGD disposed in between the expanders $E_A$, $E_B$ and the buffer tank BT. As discussed above, the gaseous cryogen (initially at a pressure P2) exiting the expander is fed to a power generation device PGD which converts some of the kinetic energy of the relatively high momentum expanded gaseous cryogen into mechanical or electrical energy.

Figure 9:
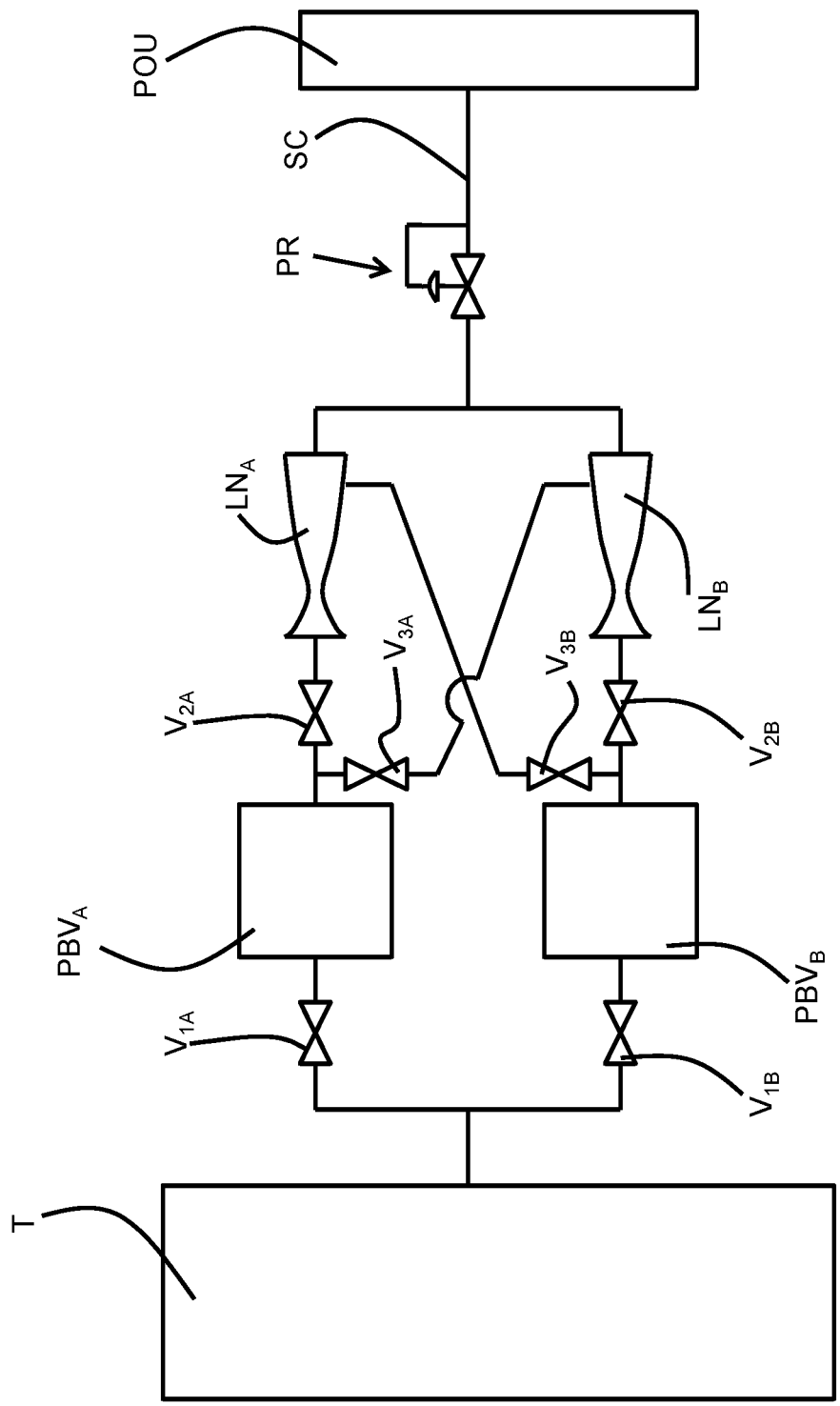
FIG. 9 is a schematic view of another embodiment of the invention with two pressure building vaporizers in parallel and enhanced refilling of the pressure building vaporizers.

The embodiment of FIG. 9 is the same as that of FIG. 7 except for the use of first and second laval nozzles $LN_A$, $LN_B$ as the expander and for the presence of valve $V_{3A}$ in fluid communication between the first vaporizer $PBV_A$ and the second laval nozzle $LN_B$, and for the presence of a valve $V_{3B}$ in fluid communication between the second vaporizer $PBV_B$ and the first laval nozzle $LN_B$. In this embodiment, and as will be explained below, the first laval nozzle $LN_A$ is used as an ejector to create a vacuum at the exit of the second vaporizer $PBV_B$ in order to hasten the filling of the second vaporizer $PBV_B$. Similarly, the second laval nozzle $LN_B$ is used as an ejector to create a vacuum at the exit of the first vaporizer $PBV_A$ in order to hasten the filling of the first vaporizer $PBV_A$. Laval nozzles, and the relationship between their configuration and the pressure reduction of gases fed to them, are well known. The skilled artisan will understand that their dimensions can be selected so as to result in the desired pressure reduction.

In the first phase, due to the venturi effect, a vacuum is created at the opening of the line in fluid communication between valve $V_{3A}$ and a downstream portion of the second laval nozzle LNB. Valves $V_{1A}$, $V_{3A}$ are opened and application of the vacuum at the outlet of the first vaporizer $PBV_A$ causes liquid cryogen to be fed from the tank T into the first vaporizer $PBV_A$ at a higher rate than would be expected in the absence of such an ejector effect. When the pressure in the second vaporizer PBVB reaches P2, valves $V_{1A}$, $V_{3A}$ are closed. In the fourth phase, the opposition action is at play. Valves $V_{1B}$, $V_{3B}$ are opened and application of the vacuum at the outlet of the second vaporizer $PBV_B$ causes liquid cryogen to be fed from the tank T into the first vaporizer $PBV_B$ at a higher rate than would be expected in the absence of such an ejector effect. When the pressure in the second vaporizer $PBV_A$ reaches P2, valves $V_{1B}$, $V_{3B}$ are closed.

Figure 10:
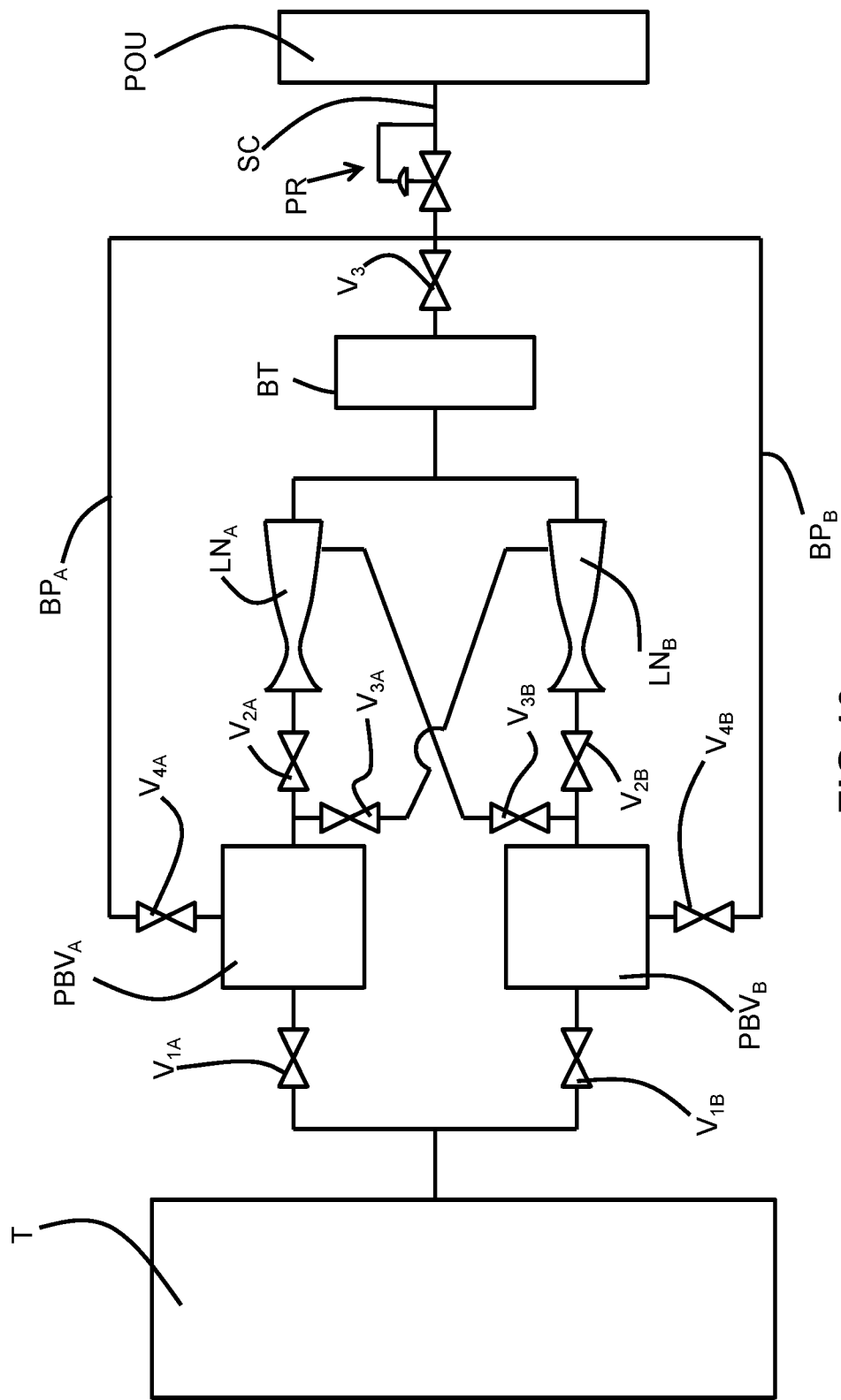
FIG. 10 is a schematic view of another embodiment of the invention with two pressure building vaporizers in parallel, enhanced refilling of the pressure building vaporizers, and a buffer tank.

The embodiment of FIG. 10 is the same as that of FIG. 9 except for the presence of valves V4A, V4B, buffer tank BT, and bypass lines BPA, BPB. Each of these features functions in the same way as described above for FIG. 7.

Figure 11:
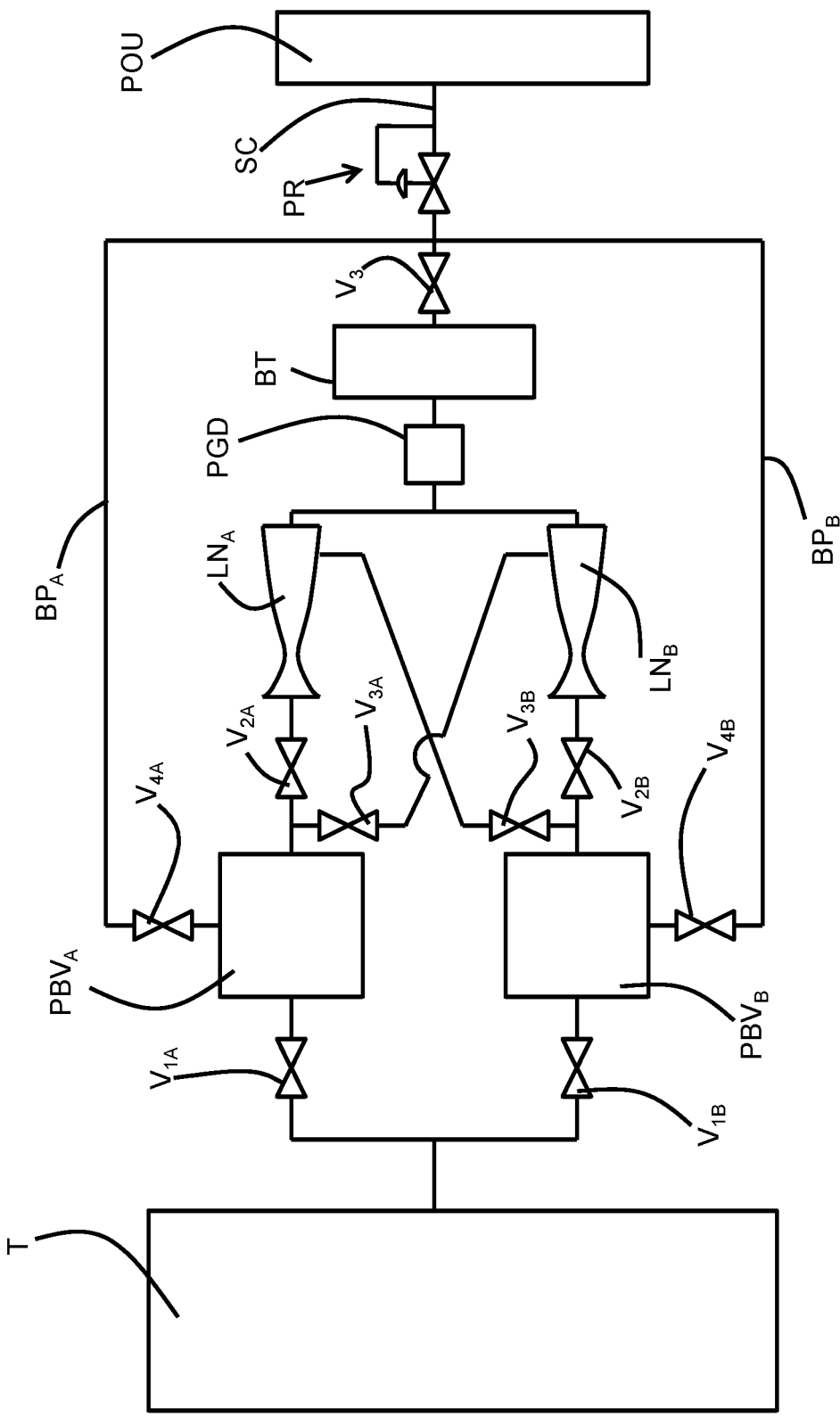
FIG. 11 is a schematic view of another embodiment of the invention with two pressure building vaporizers in parallel, enhanced refilling of the pressure building vaporizers, a power generation device, and a buffer tank.

The embodiment of FIG. 11 is the same as that of FIG. 10 except for the presence of the power generation device PGD. The power generation device PGD functions in the same way as described above.

Prophetic examples of operation of the inventive system and process in general terms will now be described.

Liquid cryogen is stored in a tank with a headspace pressure of greater than 200 psi. In the event that the headspace pressure exceeds 250 psi, a safety valve PSV may be actuated to vent the gaseous cryogen in the headspace to lower the pressure to less than 250 psi.

Liquid cryogen at a rate of less than 90 gallons per minute (for an equivalent of 500,000 std ft³/hr of gaseous cryogen) alternatingly fills two 2-gallon capacity pressure-building vaporizer with liquid cryogen and the pressure in each is allowed to build to a maximum of 3,000 psi. For example, 0.6 gallons of liquid nitrogen from the storage tank may fill the pressure-building vaporizer in 0.5 seconds at a filling rate of 60 gallons/min. Also, for a vaporization rate of 500,000 std ft³/hr and a gas transfer rate to the buffer of 30,000 std ft³/hr, the pressure in the pressure-building vaporizer ramps up from 150 psi to a maximum of 3,286 psi in 0.4 seconds. In another example, 0.6 gallons of liquid nitrogen from the storage tank may fill the pressure-building vaporizer in 0.5 seconds at a filling rate of 60 gallons/min. If the vaporization rate is 500,00 std ft3/hr and the transfer of gas to the buffer tank occurs at up to 500,000 std ft3/hr, the pressure in each pressure-building vaporizer ramps up from 150 psi to a maximum of 3,000 psi in 0.45 seconds with seven pressure-building vaporizers operating simultaneously. With only two pressure-building vaporizers, the pressure ramps up to a maximum of 1,795 psi in 0.45 seconds in each vaporizer.

The gaseous cryogen in each pressure-building vaporizer is expanded across the turbine and collected in a 50-gallon buffer tank at a maximum pressure of 500 psi. A pressure safety valve is triggered at the buffer tank if the pressure in excessive of 600 psi. When the pressure of the gaseous cryogen in the vaporizer drops below 500 psi, the pressure-building vaporizer no longer feeds the turbine and the gaseous cryogen may be dispensed directly to the end use. At this time, gaseous cryogen from the other of the two pressure-building vaporizers is instead expanded across the turbine. When the pressure of the gaseous cryogen in a pressure-building vaporizer drops below 150 psi, that pressure-building vaporizer in question is once again filled with liquid cryogen to start the cycle over.

Each turbine may be associated with one or more pressure-building vaporizers. For example, a turbine may receive high pressure gas from one, two, three, four or even more pressure-building vaporizers. While not preferred, it is even possible for one pressure-building vaporizer to feed two or more turbines.

A more or less constant supply of pressure-reduced gaseous cryogen may be realized by utilizing two or more pressure-building vaporizers and turbine in combination with a two or more corresponding venturis. As the pressure of the gaseous cryogen in a pressure-building vaporizer is reduced through expansion from a high pressure, P2, the lowered pressure may not be sufficient to both power the turbine and produce a gaseous cryogen having the point of use required pressure. Additionally, although the pressure of the gaseous cryogen in the vaporizer may be lowered, it is still too high for fast filling of that vaporizer with fresh liquid cryogen.

In order to solve these problems, two or more vaporizers each associated with a respective venturi may be operated in an alternating fashion.

The gaseous cryogen in one pressure-building vaporizer is fed to a main inlet of a first venturi (a laval) nozzle having a 2.5 mm throat diameter) and expanded down to a pressure at the outlet thereof that is at or above a point of use required pressure (e.g., <600 psi). At the outset of feeding the first venturi in such a manner, the pressure of the gaseous cryogen in another of the vaporizers is decreased from an initial high pressure (e.g., 3000 psi) to an intermediate/high pressure (e.g., 2,200 psi). Simultaneously and via the venturi effect, gaseous cryogen is withdrawn from the other vaporizer into a suction inlet formed in the first venturi downstream of the Laval nozzle throat. As a result and over a period of time (e.g., 0.5 seconds), the pressure of the gaseous cryogen remaining in the other vaporizer is reduced from an intermediate low pressure (e.g., 1,200 psi) to a low pressure (e.g., 130 psi) that is lower than a pressure in a buffer tank receiving expanded gaseous cryogen from the first and second venturis. When the pressure in the other vaporizer is reduced to the low pressure, a valve is closed and the gaseous cryogen is no longer withdrawn from the other vaporizer.

As the gaseous cryogen from the other vaporizer continues to be expanded across a turbine, the pressure of the gaseous cryogen within that vaporizer is reduced from the intermediate high to the intermediate low pressure. Simultaneously, a valve is opened and the other vaporizer is filled with an amount of liquid cryogen (e.g., 0.5 gallons) over a period of time (e.g., 1.5 seconds) from a source of liquid cryogen having a headspace pressure (e.g., 200-250 psi). At the conclusion of that time period, the valve is closed and pressure is allowed to build up inside the other vaporizer through heat exchange with ambient air. Over a period of time (e.g., 9 seconds), the pressure of the cryogen in the vaporizer drops from the intermediate high pressure to the intermediate low pressure, the pressure of the cryogen in the other vaporizer rises from the low pressure to the high pressure. One of ordinary skill in the art will recognize that the operation of the pressure building vaporizer, laval nozzle, and turbine for the two vaporizers are switched so as to feed liquid cryogen to the other vaporizer as explained above and feed the point of use with gaseous cryogen from the first vaporizer.

While the foregoing description is with respect to a single pair of pressure-building vaporizers feeding a respective pair of venturis, the skilled artisan can appreciate that many other cyclical schemes can be imagined using three or more pressure-building vaporizers and that such schemes need not be limited to a pair of pressure-building vaporizers feeding a pair of venturis.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for vaporizing liquid cryogen to supply a flow of gaseous cryogen, said method comprising the steps of:
   feeding a liquid cryogen from a storage tank to at least one pressure building vaporizer located at an installation, the storage tank having a headspace pressure $P1$;
   exchanging heat between the fed liquid cryogen and a relatively warmer fluid across said at least one vaporizer to produce pressurized gaseous cryogen at pressure $P2$ exceeding $P1$;
   feeding the pressurized gaseous cryogen from said at least one vaporizer to an expander located at the installation to expand the gaseous cryogen to a pressure $P3$;
   feeding the expanded gaseous cryogen into a supply conduit;
   feeding the expanded gaseous cryogen from the supply conduit to a point of use located at the installation, wherein $P2 \geq 2 \times P3$,
   further comprising n pressure building vaporizers operated in an alternating sequence where n is an integer greater than 1; wherein as the liquid cryogen is being fed to a first vaporizer of the n vaporizers, no liquid cryogen is being fed to a second vaporizer of the n vaporizers
   simultaneous with feeding the liquid cryogen to the first vaporizer, gaseous cryogen is fed from another of the n vaporizer to the turbine and expanded with said turbine; and
   simultaneous with feeding the liquid cryogen to the second vaporizer, gaseous cryogen is fed from another of the n vaporizers to the turbine and expanded across the turbine and converting the turbine power to electricity using an alternator.

2. The method of claim 1, wherein the fluid is ambient air.

3. The method of claim 1, wherein the fluid is water.

4. The method of claim 1, wherein $P2 \geq 2 \times P1$.

5. The method of claim 1, wherein n is 2-4.

6. The method of claim 1, wherein the cryogen is selected from the group consisting of oxygen, argon, helium, hydrogen, and carbon dioxide.

7. The method of claim 1, wherein the electricity is stored in a battery.

8. The method of claim 1, wherein the electricity is consumed at the installation.

9. The method of claim 1, wherein the electricity is input to an electrical grid.

10. The method of claim 1, wherein the point of use is a laser supplied with nitrogen.

11. The method of claim 1, wherein the point of use is an autoclave for curing polymer-impregnated articles.

12. A system for vaporizing liquid cryogen to supply a flow of gaseous cryogen, comprising:
- a liquid cryogen storage tank containing liquid cryogen, the tank being located at an installation;
- at least one pressure-building vaporizer receiving the liquid cryogen form the tank and vaporizing the received liquid cryogen;
- a turbine located at the installation expanding the vaporized cryogen received from the at least one pressure-building vaporizer and producing rotational energy;
- a generator located at the installation converting the rotational energy to electricity;
- a point of use receiving the expanded cryogen from the turbine, the point of use being located at the installation,
- further comprising n liquid valves, n vapor valves and a controller, wherein:
- the at least one pressure building vaporizer comprises n pressure building vaporizers adapted and configured to be operated in an alternating sequence where n is an integer greater than 1;
- the n liquid valves are respectively associated with the n vaporizers and are operable to independently allow or prevent receipt of liquid cryogen from the storage tank to one or more of the n vaporizers;
- the n vapor valves are respectively associated with the n vaporizers and are operable to independently allow or prevent receipt of vaporized cryogen from one or more of the n vaporizers to the turbine; and
- the controller is a programmable logic controller programmed with logic adapted to maintain a first liquid valve associated with a first vaporizer in an open position to allow the first vaporizer to be filled with liquid cryogen while contemporaneously maintaining a second vapor valve associated with a second vaporizer in an open position to allow expansion of gaseous cryogen from the second vaporizer across the turbine, contemporaneously maintaining a second liquid valve associated with the second vaporizer in a closed position to prevent the second vaporizer from being filled with the liquid cryogen from the storage tank, and contemporaneously maintaining a first vapor valve associated with the first vaporizer in a closed position to prevent the expansion of gaseous cryogen from the first vaporizer across the turbine.

13. The system of claim 12, wherein n is 2-4.

14. The system of claim 12, further comprising a battery storing electricity generated by the generator.

15. The system of claim 14, wherein the generator is connected to an electrical grid and inputs the generated electricity to the electrical grid.

16. The system of claim 12, wherein the point of use is a laser supplied with nitrogen.

17. The system of claim 12, wherein the point of use is an autoclave for curing polymer-impregnated articles.

* * * * *